Patented July 18, 1950

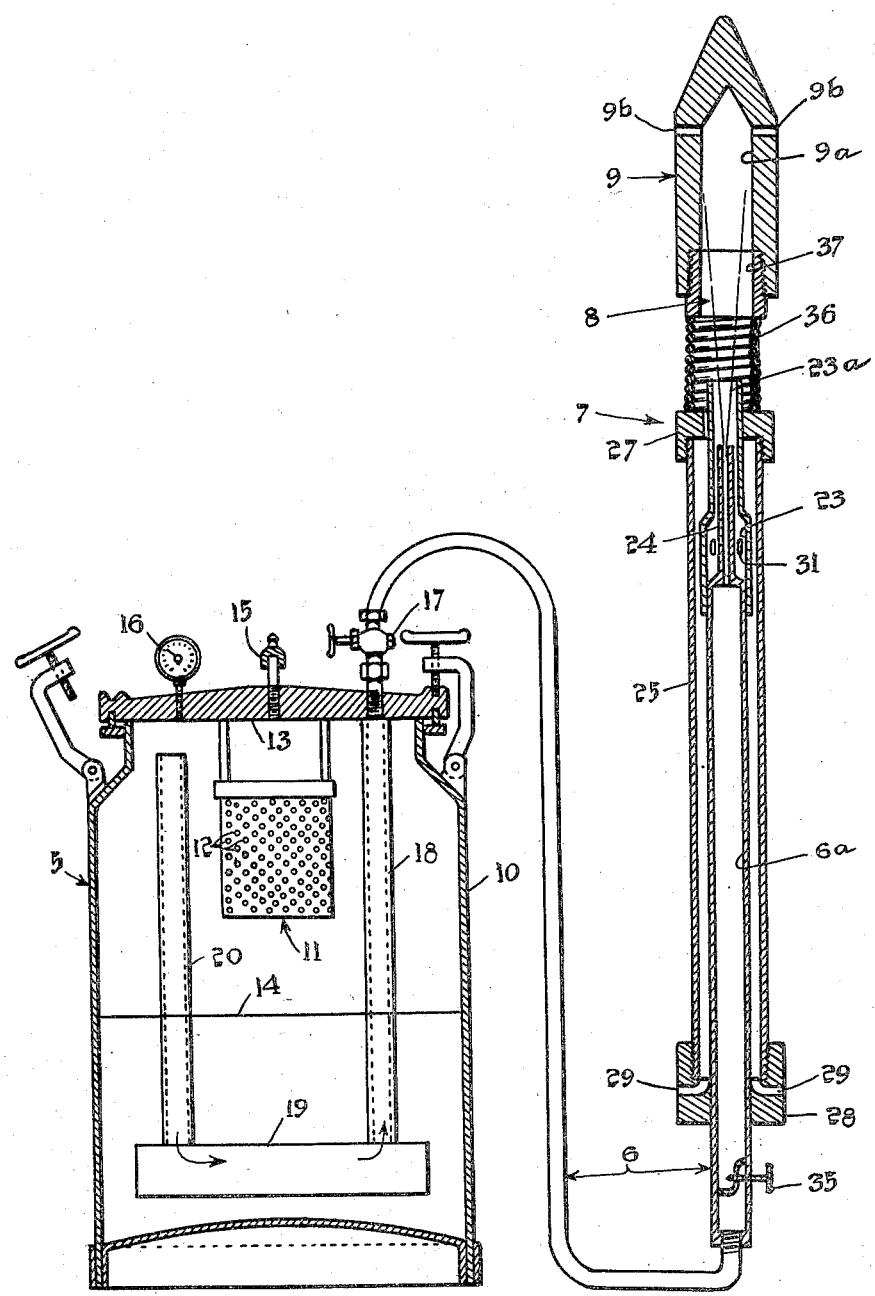

2,515,462

UNITED STATES PATENT OFFICE 2,515,462

SOLDERING IRON

William McGruer, Montreal, Quebec, Canada

Application June 9, 1945, Serial No. 598,528
In Canada May 4, 1945

1 Claim. (Cl. 158—26)

This invention relates to soldering apparatus of the type in which the soldering iron is attached to a hollow handle to which gas is supplied to produce a flame which is directed against the soldering iron.

The main object is to provide apparatus of this type including an improved type of gas generator and improved means for mounting the soldering iron in relation to the handle through which the gas is delivered to a burner properly located with reference to the soldering iron.

Proceeding now to a more detailed description reference will be had to the accompanying drawings, in which the single figure is a vertical sectional view of the complete apparatus embodying my invention.

Referring more particularly to the drawings, 5 designates a gas generator from which gas is supplied through a tube 6 to a burner 7 from whence a flame 8 is directed against the soldering iron 9.

The generator 5 comprises a tank 10 within which is arranged a carbide container 11 provided with a multiplicity of openings 12. The container 11 is suspended from the tank cover 13 so that it is above the water line 14. The cover 13 is provided with a safety valve 15, a pressure gauge 16 and a valve controlled gas outlet connection 17, the latter being connected to the tube 6. The outlet 17 is also connected by a vertical conduit 18 to one end of a condenser 19, the other end of which is connected to a vertical pipe 20. In using the gas generator the tank 10 is shaken so that water is splashed through the openings 12 of the carbide container 11. The gas generated by thus bringing the water into contact with the carbide passes downwardly through the pipe 20 to the condenser 19 and from thence through the pipe 18 and outlet 17 to the hose 6.

One end of tube 6 extends into the lower end of a mixing chamber 23 and is fitted with a restricted gas discharge nozzle 24. Chamber 23 is arranged within a hollow pipe 25 which serves as the handle of the soldering iron. A burner cap 27 is fitted on the upper end of a pipe 25 and is provided with a central opening for the passage of a nozzle 23a which forms part of mixing chamber 23 and surrounds the gas nozzle 24. The lower end of pipe 25 is fitted with an air inlet cap 28 provided with openings 29 through which air enters the annular space reserved between pipe 25 and the pipe enclosed portion 6a of gas supply tube 6. Air entering through openings 29 passes into mixing chamber 23 through suitable openings 31 and mixes with the gas from nozzle 24 to form a combustible mixture which is ignited to provide a flame 8 issuing from the mixing chamber nozzle 23a. The flow of gas through tube 6 to mixing chamber 23 is regulated by a needle valve 35 which is preferably arranged close to the air inlet cap 28 of handle member 25.

The soldering iron 9 is arranged in alignment with the nozzle 23a and is provided with a bore 9a into which the flame 32 is directed, the wall of said bore being provided with gas outlet openings 9b in the vicinity of the tip portion of the soldering iron. The lower end of soldering iron 9 is secured to burner cap 27 by a coil spring 36 having its lower end welded or otherwise secured to the burner cap and its upper end welded or otherwise secured to the lower end of a bushing 37 which is threaded into the lower end of the soldering iron bore 9a. The coil spring 36 provides a flexible conduit and is made of an alloy characterized by high heat and flame resistance.

Having thus described what I now consider to be the preferred embodiment of the invention various modifications may be resorted to within the scope and spirit of the appended claim.

I claim:

A soldering apparatus comprising a hollow handle member, a burner cap closing one end of said hollow handle member, said cap being provided with a central opening therein, a mixing chamber having side openings provided in said handle member adjacent said cap, said mixing chamber being arranged within said handle member to provide an annular space between the side walls of the chamber and that portion of the handle member surrounding said chamber, an elongated mixing chamber nozzle carried by said mixing chamber and extending outwardly through said burner cap opening to project a substantial distance beyond said opening, an inlet cap closing the other end of said hollow handle member, said inlet cap being provided with a central opening and side air inlet openings, a gas supply tube having one end connected to a gas source of supply, said tube extending through the central opening in the inlet cap and arranged in said handle member to provide an annular space between the side walls of the tube within the handle and the surrounding walls of the handle for the passage of air from the side inlet openings of the inlet cap to the mixing chamber through the side openings provided in said mixing chamber, said tube having its opposite end fitted in the end of the chamber remote from the chamber nozzle, a restricted throat gas supply nozzle carried by the discharge end of said tube, said gas supply nozzle being arranged in the mixing chamber with its discharge end projecting beyond the side openings of the mixing chamber for a substantial distance into the mixing chamber nozzle and in spaced relation to the surrounding walls of the chamber and chamber nozzle to permit the passage of air from the side openings of the mixing chamber into the mixing chamber nozzle to mix with the gas in the nozzle of the mixing chamber, a soldering iron provided with a hollow bore and with outlet openings in the tip portion of the iron and a flexible coupling surrounding the projecting portion of the mixing nozzle and having one end connected to the iron and the other end connected to the burner cap so that the flame resulting from ignition of the combustible air and gas mixture supplied to the mixing chamber is directed against the inner wall of the soldering iron from said mixing nozzle.

WILLIAM McGRUER.

REFERENCES CITED

The following references are of record in the file of this patent:

UNITED STATES PATENTS

| Number | Name | Date |
|---|---|---|
| 164,216 | Rogers | June 8, 1875 |
| 226,753 | Hull | Apr. 20, 1880 |
| 365,293 | Brasch | June 21, 1887 |
| 936,816 | Schemnitz | Oct. 12, 1909 |
| 957,327 | Greene | May 10, 1910 |
| 1,283,697 | Donges | Nov. 5, 1918 |
| 1,357,425 | Romanoff | Nov. 2, 1920 |
| 1,658,447 | Dice | Aug. 4, 1925 |
| 1,549,224 | Schmidt | Aug. 11, 1925 |
| 1,782,872 | Forster | Nov. 25, 1930 |
| 1,880,649 | Young | Oct. 4, 1932 |
| 1,944,860 | Cohan | Jan. 23, 1934 |
| 2,203,210 | Young | June 4, 1940 |
| 2,268,995 | Young | Jan. 6, 1942 |
| 2,271,325 | Young | Jan. 27, 1942 |